US008582120B2

(12) United States Patent
Gallai

(10) Patent No.: US 8,582,120 B2
(45) Date of Patent: Nov. 12, 2013

(54) MEASUREMENT DEVICE AND METHOD

(76) Inventor: Charles Gallai, Granada Hills, CA (US)

( * ) Notice: Subject to any disclaimer, the term of this patent is extended or adjusted under 35 U.S.C. 154(b) by 290 days.

(21) Appl. No.: 12/960,270

(22) Filed: Dec. 3, 2010

(65) Prior Publication Data

US 2012/0140246 A1 Jun. 7, 2012

(51) Int. Cl.
*G01B 11/14* (2006.01)

(52) U.S. Cl.
USPC .......................................... 356/616; 356/620

(58) Field of Classification Search
USPC .................................................. 356/600–640
See application file for complete search history.

(56) References Cited

U.S. PATENT DOCUMENTS

| | | | | | |
|---|---|---|---|---|---|
| 4,703,563 | A | * | 11/1987 | Hoshino et al. | 33/227 |
| 5,541,727 | A | * | 7/1996 | Rando et al. | 356/149 |
| 5,979,068 | A | * | 11/1999 | Andrews | 33/520 |
| 6,005,719 | A | * | 12/1999 | Rando | 359/629 |
| 6,247,238 | B1 | * | 6/2001 | Harvey et al. | 33/286 |
| 6,470,579 | B2 | * | 10/2002 | Allen | 33/286 |
| 7,269,908 | B1 | * | 9/2007 | Alvar | 33/286 |

* cited by examiner

*Primary Examiner* — Gregory J Toatley
*Assistant Examiner* — Jarreas C Underwood
(74) *Attorney, Agent, or Firm* — The Eclipse Group LLP

(57) ABSTRACT

A measurement device for determining an installation position for a fire sprinkler head is provided. The measurement device includes a body adapted for positioning across and proximate to the center of a tile grid cell. The measurement device also includes a light source mounted to the body. The light source is adapted to project a beam of light onto a surface positioned above the tile grid cell. When the measurement device is positioned across the tile grid cell, the light source is proximate to the center of the tile grid cell.

21 Claims, 5 Drawing Sheets

MEASUREMENT DEVICE AND METHOD

BACKGROUND OF THE INVENTION

1. Field of the Invention

This invention relates to measurement devices for providing a reference point and, in particular, relates to devices used to assist in the installation of fire sprinkler heads.

2. Related Art

The installation of fire sprinkler systems is an important part of building construction. Often, fire sprinkler systems are installed in conjunction with dropped ceilings, which may be secondary ceilings hung below the main structural ceiling. Dropped ceilings may be used to conceal piping, wiring, ductwork, etc. in the plenum space above the dropped ceiling. Dropped ceilings may be constructed of a metal tile grid with a panel (or tile) positioned within the individual cells of the grid. The panels may be constructed from mineral fibers or other suitable materials. Often panels have 2'×2' (two foot-by-two foot) square dimension or a 2'×4' (two foot-by-four foot) rectangular dimension.

Installing a fire sprinkler system in a building having dropped ceilings may involve positioning a fire sprinkler head in one of the tile grid panels. In buildings having existing water pipes, the fire sprinkler head may use the existing water pipes as a water source. Further, for aesthetics and reducing potential water damage to adjacent light fixtures and other equipment installed the ceiling, it may be preferred that a fire sprinkler head be positioned in the center of the panel. In the case of 2'×2' panels, the center of the panel is approximately 1' (one foot) from each edge of the tile grid cell. Alternatively, in the case of 2'×4' rectangular panels, the center is approximately 1' (one foot) and 2' (two feet) from the respective side edges of the tile grid cell.

However, the distance from the center of the panel and tile grid cell to the nearest water source may vary from building to building. Consequently, the amount of pipe needed to connect the fire sprinkler head positioned at the center of the tile grid cell to the water source may also vary. Those installing the fire sprinkler system may have difficulty in determining the distance from the nearest water source to the center of tile grid cell having the fire sprinkler head. Known techniques may, for example, use a plumb-bob to identify the center of the tile grid cell when measuring from the center of the panel to the nearest water source. However, use of a plumb-bob may be time consuming and cumbersome. Thus, there exists a need for an improved device and method for determining the center of a tile grid cell when installing a fire sprinkler head.

SUMMARY

A measurement device for determining an installation position for a fire sprinkler head is provided. The measurement device includes a body adapted for positioning across and proximate to the center of a tile grid cell. The measurement device also includes a light source mounted to the body. The light source is adapted to project a beam of light onto a surface positioned above the tile grid cell. When the measurement device is positioned across the tile grid cell, the light source is proximate to the center of the tile grid cell.

A method of determining an installation position for a fire sprinkler head is also provided. The method includes positioning a measurement device across a tile grid cell. The measurement device includes a light source mounted to a body of the device. When the measurement device is positioned across a tile grid cell, the light source is positioned proximate to the center of the tile grid cell. The method also includes projecting, with the light source, a beam of light onto a surface position above the tile grid cell. The beam of light provides a reference point on the surface positioned above the tile grid cell.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

FIGS. 1-6E illustrate various implementations of a measurement device 100 of the present invention. The measurement device includes a body adapted for positioning across and proximate to the center of a tile grid cell, and a light source mounted to the body. The light source is adapted to project a beam of light at an angle substantially perpendicular to the longitudinal plane of the body. When positioned across the tile grid cell, the beam of light provides a reference point proximate to the center of the tile grid cell. From that reference, a sprinkler head installer may measure the distance from the center of tile grid cell to the nearest water source. The measurement device is designed to be lightweight, shatter-proof, and easy to use.

Figure 1:
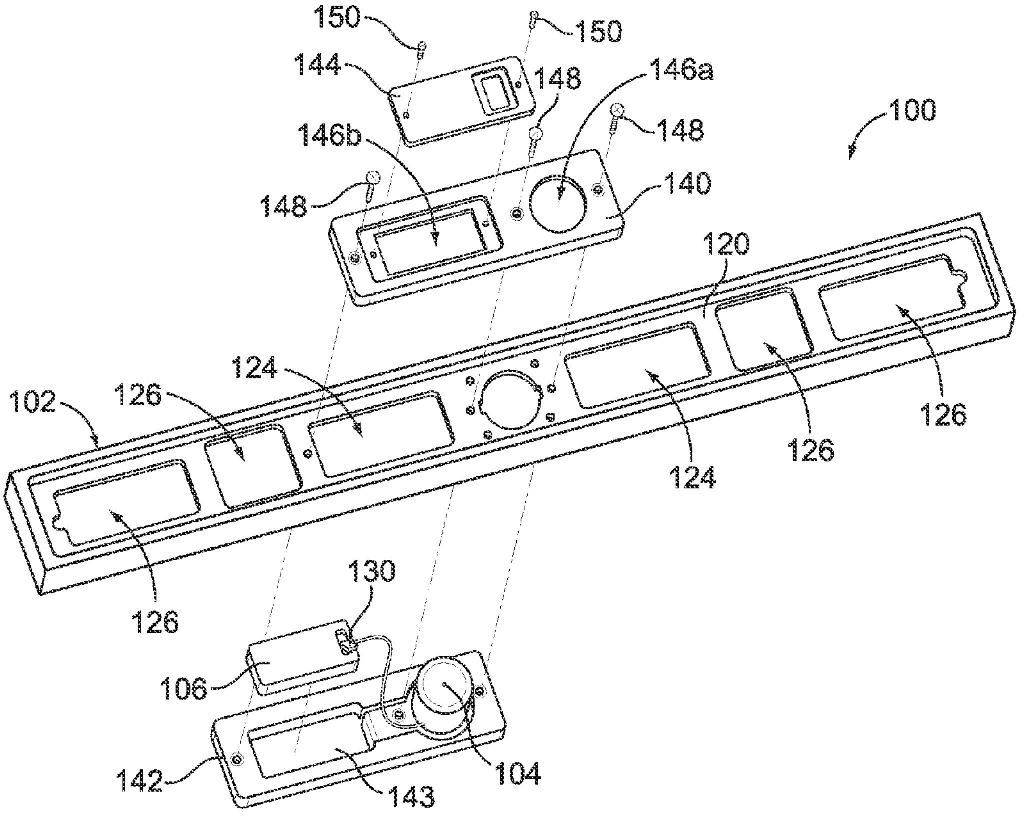
FIG. 1 is an exploded perspective view of one example of an implementation of a measurement device of the present invention.

In particular, FIG. 1 illustrates an exploded perspective view of one example of a measurement device 100 that includes a body 102, a light source 104, a power source 106, and various housing components 140-144. The body 102 of the device 100 includes an elongate frame 120 onto which the light source 104 is attached. The frame 120 may be constructed of plastic, metal, ceramic, wood, fiberglass, or any other suitable material. The frame 120, in the example shown, includes a central aperture 122 and an opposing pair of cut-outs 124 near the center of the frame 120 for positioning the light source 104 and the power source 106 when the light source and power source are mounted to the frame. The frame 120 also may include an additional set of cut-outs 126 near the ends of the frame to lighten the weight of frame and to provide additional gripping surfaces for the user.

In most implementations, the frame 120 may have a length of approximately two feet. As explained further below, the length of the frame 120 is selected to allow the device 100 to be easily placed into and across a tile grid cell such that the light source 104 is positioned near the center of the tile grid cell. The frame 120 may be formed by machining, die casting, stamping, injection molding, and the like.

Figure 4:
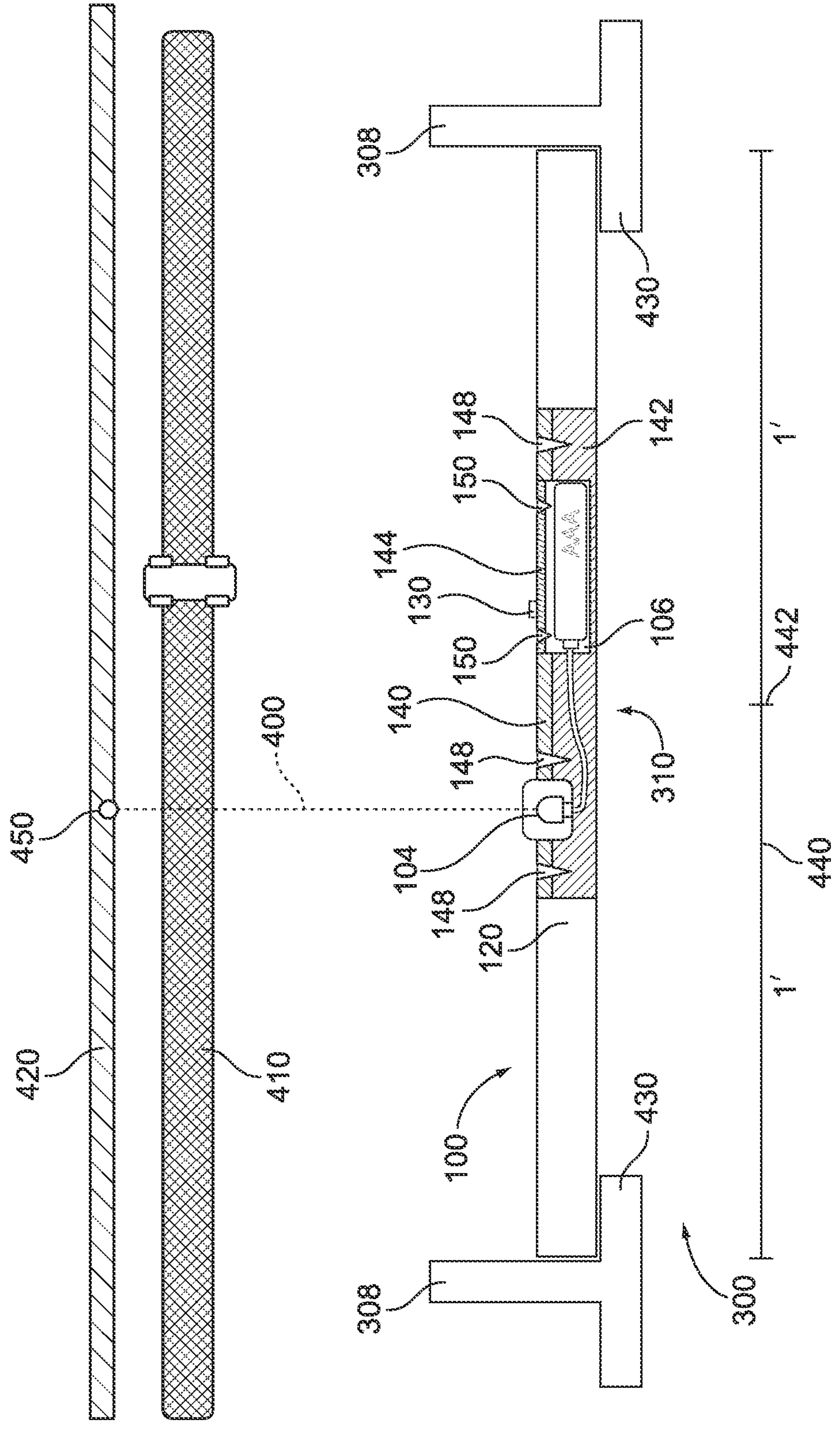
FIG. 4 is a side cross-sectional plan view of the measurement device of FIG. 2 installed in a tile grid.

The light source 104 is adapted to project a beam of light 400 (FIG. 4) upwards, away from the frame 120 of the device 100 towards a surface above the tile grid (see FIG. 4). In most implementations, the beam of light 400 is projected at an angle of approximately 90° relative to the longitudinal plane of the frame 120. The light source 104 may be, for example, a laser diode that projects a beam of light 400 around 630-680 nanometers (nm).

The power source 106 may be coupled to the light source 104 for providing power to the light source. The power source 106 may include a switch 130 for toggling power to the light source 104. In the example shown, the power source 106 is a battery pack providing power to the light source 104 via two exchangeable AAA batteries. Other power sources may be selectively employed for providing power the light source.

The light source 104 and power source 106 may be mounted to the frame 120 via various housing components. As seen in FIG. 1, the housing components include a cover piece 140, a backing piece 142, and a cover plate 144 for the power source. Also seen in FIG. 1, the frame 120 is sandwiched between the cover piece 140 and the backing piece 142. Like the frame 120, the cover piece 140 includes respective apertures 146*a* and 146*b* for receipt of the light source 104 and the power source 106 when the measurement device 100 is in an assembled configuration. Various screws 148 secure the cover piece 140 to the backing piece 142 thus securing the cover piece and backing piece to the frame 120. Those skilled in the art will recognize that other suitable means of attachment may be used to secure the light source and the power source to the frame.

The light source 104, in the example shown, is mounted to the backing piece 142. Similarly, the power source 106 is secured within a recess 143 of the backing piece 142. As can be seen from FIG. 2, the light source 104 and power source 106 extend through the respective aperture 122 and cut-outs 124 of the frame 120 when the device 100 is assembled. The light source 106 also extends through the aperture 146*a* of the cover piece 140 when the device 100 is assembled. The cover plate 144 for the power source 106 fits within the power source aperture 146*b* of the cover piece 140 leaving only the switch 130 exposed, as shown by way of example in FIG. 1. The cover plate 144 for the power source 106 may also be secured to the cover piece 140 via a pair of screws 150 or other suitable attachment means.

Figure 2:
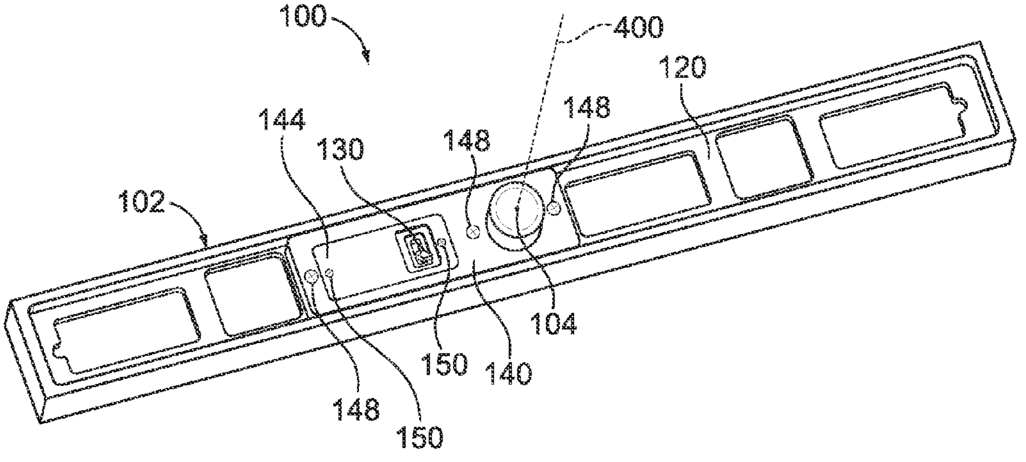
FIG. 2 is a perspective view of the measurement device of FIG. 2 as assembled.

FIG. 2 illustrates a perspective view of an assembled measurement device 100 of the present invention. As seen in FIG. 2, the light source 104 is positioned at the center of the frame 120, and the switch 130 toggles power to the light source. Toggling the switch 130 sends power to the light source 104, which, in response, projects a beam of light 400 (FIG. 4) away from the frame 120. When the measurement device 100 is positioned within the cell of a tile grid (as shown in FIG. 4), the light source 104 projects the beam of light 400 towards an upper surface positioned above the tile grid and the measurement device 100.

Figure 3B:
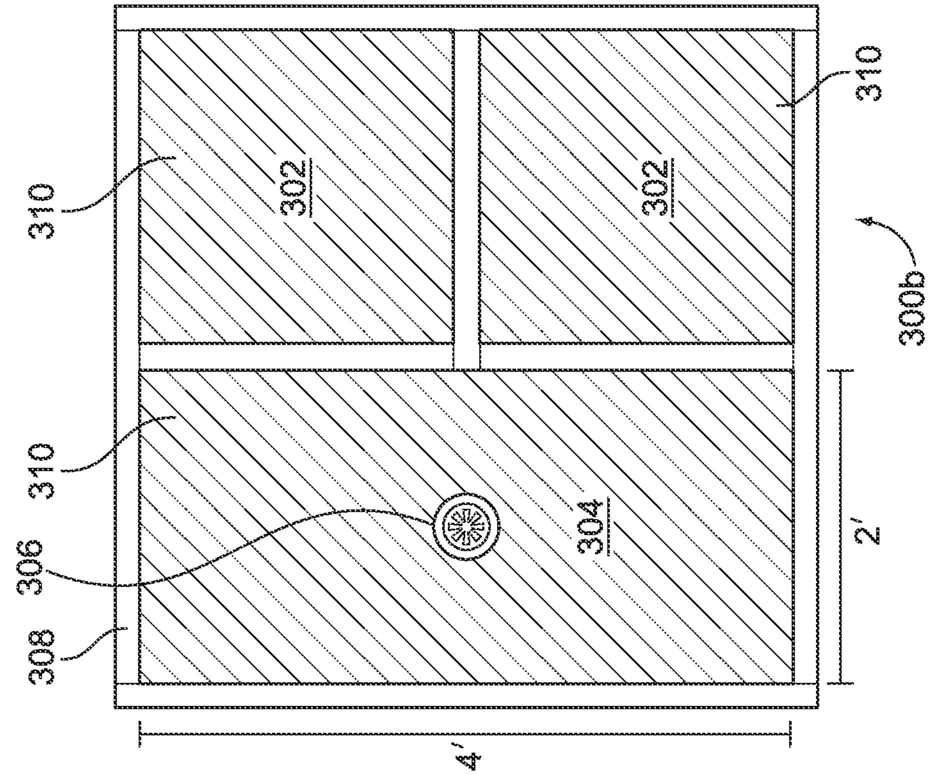
FIG. 3B is a bottom plan view of a second tile grid having a fire sprinkler head installed in a 2'×4' panel.
Figure 3A:
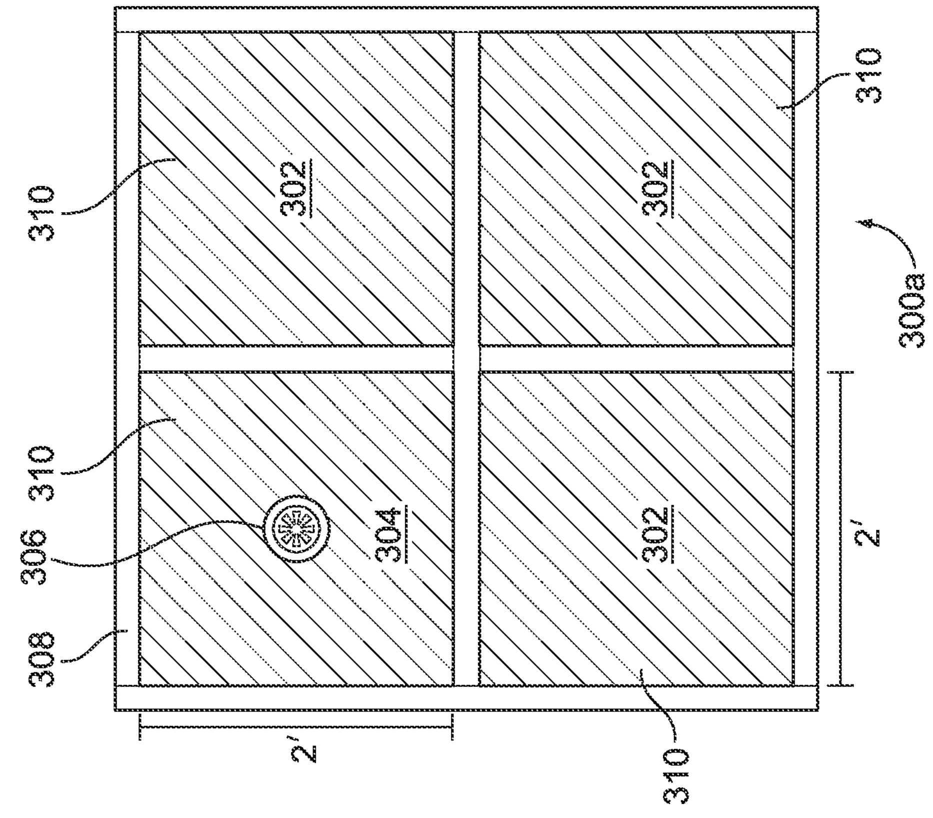
FIG. 3A is a bottom plan view of a first tile grid having a fire sprinkler head installed in a 2'×2' panel.

Measurement devices of the present invention may be used to install sprinkler heads in title grids of varying dimensions. For example, FIG. 3A illustrates a bottom plan view of a first tile grid 300*a*. The first tile grid 300*a* includes four 2'×2' square panels 302 as shown. Similarly, FIG. 3B illustrates a bottom plan view of a second tile grid 300*b*. In this example, the second tile grid 300*b* includes two 2'×2' square panels 302 and one 2'×4' rectangular panel 304. As shown in FIGS. 3A and 3B, fire sprinkler heads 306 may be installed respectively at the center of the square panel 302 of the first tile grid 300*a* and the center of the rectangular panel 304 of the second tile grid 300*b*.

The tile grids 300*a-b* may include grid channels 308, often made of metal, and arranged in cells 310 for positioning and arranging the panels 302, 304. The grid channels 308 may have an inverted "T" shape (see FIG. 4 below), which may be used to hold the panels 302, 304 in place. When installing the sprinkler head 306 of a fire sprinkler system, a hole may be cut through the center of the panel 302, 304 and the fire sprinkler head may be fed through the hole as shown in FIGS. 3A and 3B. In this way, the sprinkler head 306 is available to douse the room below the panels 302, 304 with water in the event of a fire. The measurement device described herein may be employed to determine the distance from a nearby water source to the fire sprinkler head 306 positioned at the center of a panel 302, 304 and a tile grid cell 310.

Referring now to FIG. 4, a cross-section view of an example measurement device 100 positioned within a cell 310 of a tile grid 310 is shown. As illustrated, the tile grid 310 is positioned near a water source 410 and below an upper surface 420. The water source 410 may be, for example, a water pipe that is part of an existing plumbing system for a building as discussed above. The upper surface 420 may be, for example, the floor of the building level above the dropped ceiling or even the roof of the building itself.

As mentioned above, the tile grid 310 may include grid channels 308 having an inverted "T" shape. Accordingly, the channels 308 may include a lip 430 that supports a panel positioned within the tile grid cell 310. The channel lip 430 may also support the measurement device 100 when the device is positioned within the tile grid cell 310, as shown by way of example in FIG. 4. As seen in FIG. 4, some grid channels 308 may be positioned about two feet from one another to match the width of the 2'×2' panels 302 and the 2'×4' panels 304 (FIG. 3).

Also mentioned above, the length of the frame 120 (two feet) matches the width of the 2'×2' panels 302 and the 2'×4' panels 304. Accordingly, when the measurement device 100 is positioned within a tile grid cell 310 as seen in FIG. 4, the device extends across the cell and rests on the lips 430 of grid channels 308 much like the panels themselves. Moreover, because the light source 104 is positioned at the center of the frame 120, the light source is equidistant from each grid channel 308 and thus positioned at the center (denoted by 442) of the axis (denoted by 440) extending across the tile grid cell 310.

The light source 104 projects a beam of light 400 away from the measurement device 100 towards an upper surface 420 positioned above the device. The beam of light 400 is projected on the upper surface 420 to provide a measurement reference point 450 on the upper surface. As explained further below, the reference point 450 may be used to measure the distance from the nearest water source 410 to the center 442 of the tile grid panel 310.

Figure 5:
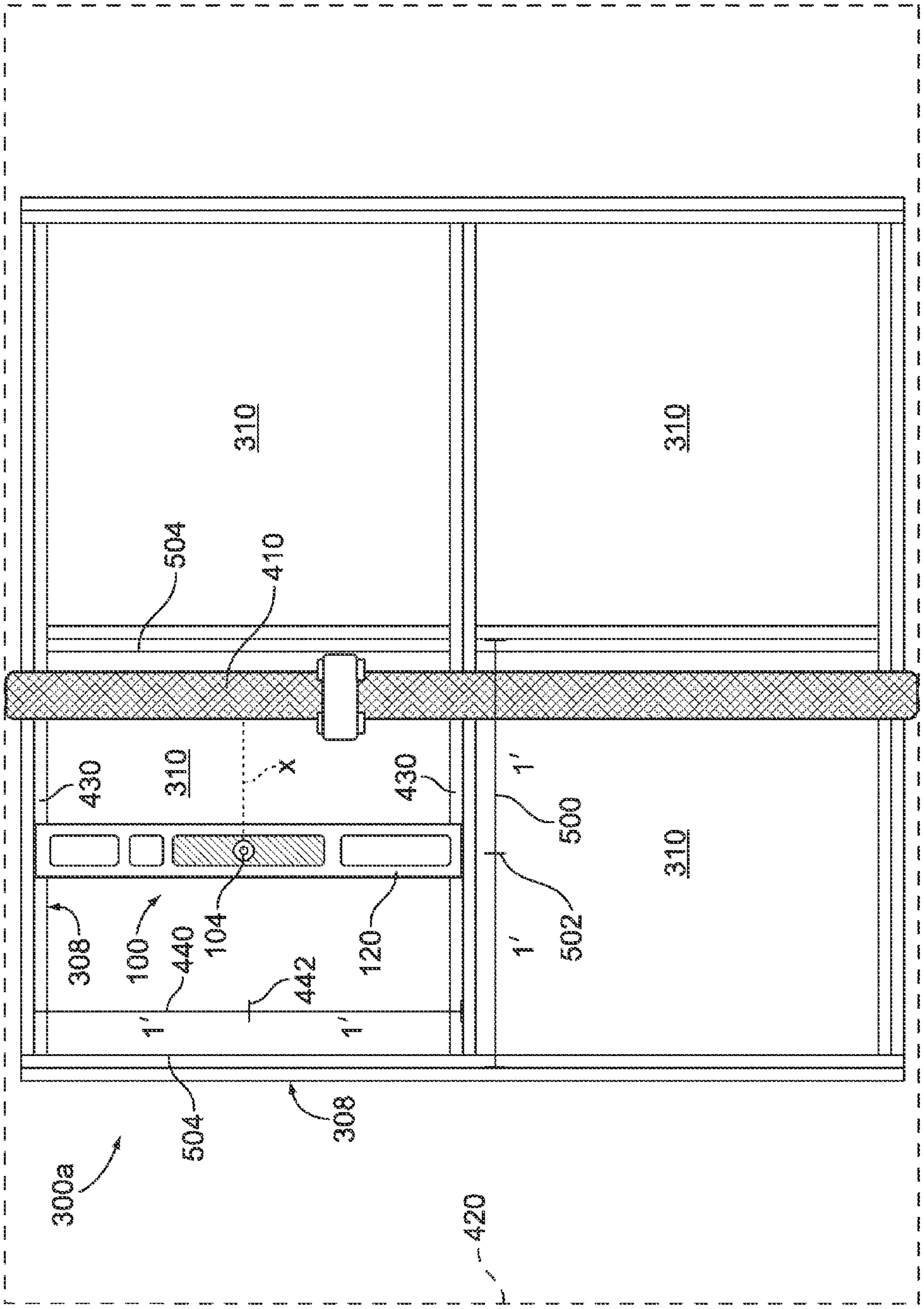
FIG. 5 is a top plan view of the measurement device of FIG. 2 installed in a tile grid.

FIG. 5 illustrates a top cross-sectional view of an example measurement device 100 installed at the center of a tile grid cell 310. As illustrated, the measurement device 100 and tile grid cell 310 are positioned near a water pipe 410, below an upper surface 420 of a building floor or ceiling. During use, a sprinkler installer may extend the measurement device 100 across the tile grid cell 310 such that the ends of the device 100 rest on the lips 430 of the grid channels 308. As previously mentioned, because the light source 104 is positioned at the center of the frame 120 of the device 100, when the device is positioned within a tile grid cell 310, the light source 104 is thus positioned along the center 442 of the axis 440 extending across the tile cell. In order to position the light source 104 at the center 502 of the corresponding orthogonal axis 500 and thus at the center of the tile grid cell 310, an sprinkler installer may simply measure with a tape measure one foot (in the case of 2'×2' panels) or two feet (in the case of 2'×4' panels) from the corresponding side 504 of the tile cell 310.

When the measurement device 100 is positioned within the tile grid cell 310 such that the light source 104 of the device is positioned at the center of the cell, the light source may be activated to project a beam of light 400 (FIG. 4) onto the surface 420 above the device and the tile grid 310. The beam of light 400 thus provides a reference point 450 (FIG. 4) from which the distance (denoted by X) to the nearest water source 410 may be measured as shown in FIG. 5. An operator installing a fire sprinkler system may then determine that a segment of pipe having approximate length X is needed to connect the fire sprinkler head 306 (FIGS. 3A and 3B) at the center of the panel 302, 304 (FIGS. 3A and 3B) and tile grid cell 310 to the water source 410.

The present invention provides a quick, yet accurate means for centering a sprinkler head in a tile panel for aesthetic and operational purposes. Properly centered sprinkler heads may reduce water damage to adjoining appliances installed in the tile panels, such as industrial light fixtures or air conditioning ducts, when the sprinkler heads are activated during a fire.

Figure 6A:
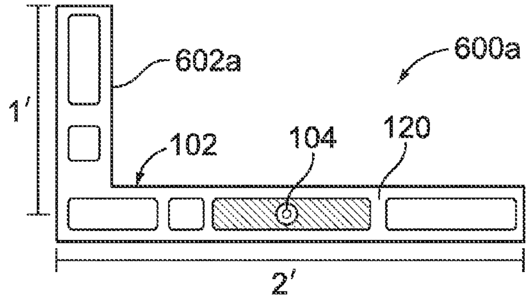
FIG. 6A is a top view of an example of a measurement device according to another implementation of the present invention.
Figure 6B:
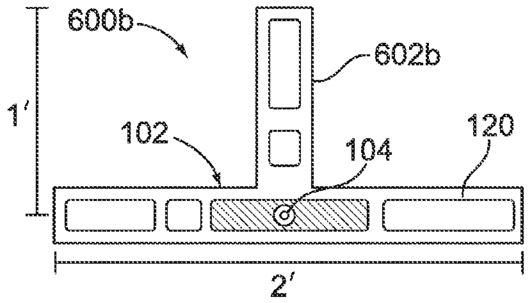
FIG. 6B is a top view of an example of a measurement device according to another implementation of the present invention.

FIGS. 6A-6E illustrate several example measurement devices according to various implementations of the present invention. In particular, the example measurement devices 600*a* through 600*e*, each include at least one arm 602*a-e* respectively attached to the body 102 of each device. The arms 602*a-e*, in the examples shown, are positioned perpendicular to the body 102 of the measurement devices 600*a-e*. The arms 602*a-e* are designed to eliminate the need to measure from a corresponding side 504 (FIG. 5) of a tile grid cell 310 when placing and positioning the device 600*a-e* within the tile grid cell. For example, the arms 602*a-b* of the alternative embodiments 600*a-b* may have a length of around one foot for positioning the devices in a 2'×2' tile grid cell 300*a* (FIG. 2). Accordingly, an operator may position a device 600*a-b* having an arm 602*a-b* as shown in FIGS. 6A-B in the tile grid cell 310 and slide the device towards the corresponding side 504 of the cell until the arm abuts the grid channel 308 (FIGS. 4-5) at the corresponding side. As a result, an operator does not need to measure to the center of the tile grid cell 310 from the corresponding side 504 since the frame 120 and the arm 602*a-b* position the light source 104 at the center of the tile grid cell.

Figure 6C:
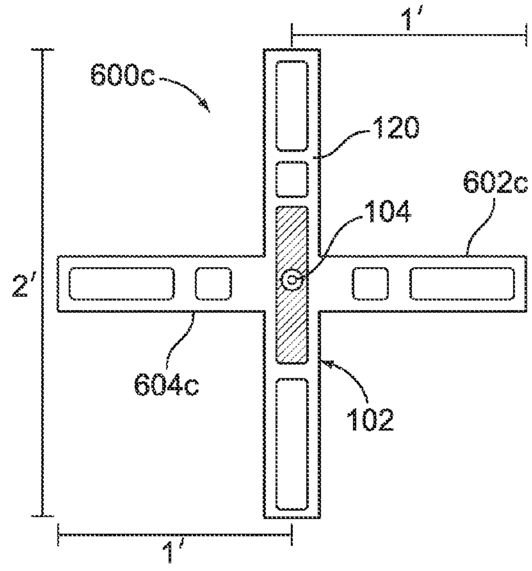
FIG. 6C is a top view of an example of a measurement device according to another implementation of the present invention.
Figure 6D:
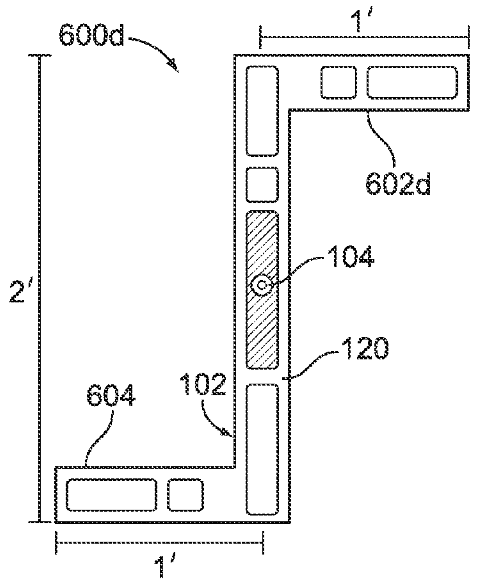
FIG. 6D is a top view of an example of a measurement device according to another implementation of the present invention.
Figure 6E:
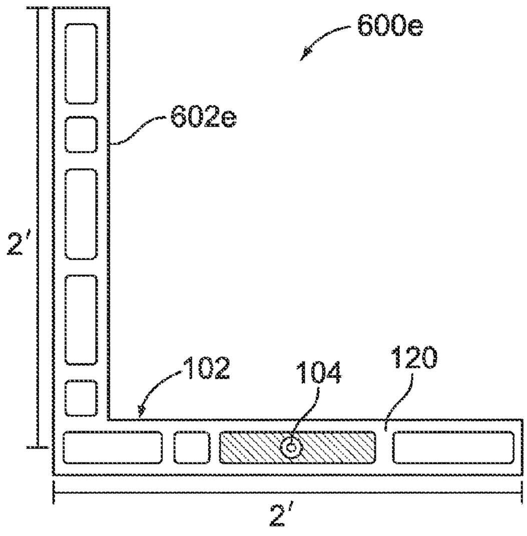
FIG. 6E is a top view of an example of a measurement device according to another implementation of the present invention.

FIG. 6E also includes an embodiment 600*e* wherein the arm 602*e* of the device is two feet in length. This 600*e* embodiment may be used for 2'×4' tile grid cells 310 (FIG. 1) where the distance to the center of the tile grid cell from the corresponding side 504 is two feet rather than one foot. Additionally, FIGS. 6C-D includes two embodiments 600*c-d* of the measurement device each having a first arm 602*c-d* as described above as well as a second arm 604*c-d* also attached and positioned perpendicular relative to the frame 120 of the device. As seen in FIGS. 6C-D, the second arm 604*c-d* may be positioned on the side of the device 600*c-d* opposite the first arm 602*c-d* such that the second arm extends away from the first arm. In one embodiment 600*c*, the second arm 604*c* may be positioned directly opposite the first arm 602*c* to give the device a cross-like shape.

The additional arms 604*c-d* are designed to eliminate the need to slide the device 600*c-d* towards the corresponding side 504 of the tile grid cell 310 when positioning the device in the cell. As can be seen in FIG. 6, the pair of respective arms 602*c-d*, 604*c-d* in cooperation with the frames 120 position the light sources 104 of the respective devices 600*c-d* directly at the center of the tile grid cell without the need for additional measurements or movement of the device. Those skilled in the art will recognize that the alternative embodiments are not exhaustive and are shown by way of example only. Consequently, additional and/or alternative features and/or elements may selectively be employed.

In general, terms such as "coupled to," and "configured for coupling to" and "secured to" (for example, a first component is "coupled to" or "is configured for coupling to" or is "secured to" a second component) are used herein to indicate a structural, functional, mechanical, electrical, signal, optical, magnetic, electromagnetic, ionic or fluidic relationship between two or more components or elements. As such, the fact that one component is said to couple to a second component is not intended to exclude the possibility that additional components may be present between, and/or operatively associated or engaged with, the first and second components.

While implementations of the present invention are described herein for installation of fire sprinkler systems, persons skilled in the art will appreciate that measurement devices of the present invention may be used to install standard sprinkler systems or other equipment or appliances in the tile panels of ceiling grids. The invention illustratively disclosed herein suitably may be practiced in the absence of any element, part, step, or component which is not specifically disclosed herein.

The foregoing description has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A measurement device for determining an installation position for a sprinkler head comprising:

a body adapted for positioning across and proximate to the center of a tile grid cell; and a light source mounted to the body wherein the light source is adapted to project a beam of light onto a surface positioned above the tile grid cell and wherein the light source is proximate to the center of the tile grid cell when the measurement device is positioned across the tile grid cell;

wherein the upward-shining beam is used to determine an installation position for a sprinkler head.

2. The measurement device of claim 1 where the body comprises an elongate frame and wherein the light source is positioned proximate to the center of the frame.

3. The measurement device of claim 2 where the elongate frame has a length of approximately two feet.

4. The measurement device of claim 3 wherein the light source is a laser diode.

5. The measurement device of claim 4 wherein the beam of light projected onto the surface provides a reference point for measuring the distance from the center of the tile grid cell to a water source.

6. The measurement device of claim 3 further comprising an arm attached and positioned substantially perpendicular relative to the frame, the arm adapted to position the measurement device proximate to the center of the tile grid cell.

7. The measurement device of claim 6 wherein the arm has a length of around one foot.

8. The measurement device of claim 6 wherein the arm has a length of around two feet.

9. The measurement device of claim 6 wherein the arm comprises a first arm and further comprising a second arm attached and positioned substantially perpendicular relative to the frame wherein the second arm extends in a direction opposite the first arm.

10. A method of determining an installation position for a fire sprinkler head comprising:

positioning a measurement device along a first axis of a tile grid cell such that a light source mounted to a body of the measurement device is positioned proximate the center of the first axis of the tile grid cell;

positioning the light source at a location where the center of the first axis intersects the center of a second axis of the tile grid cell; and projecting, with the light source, a beam of light onto a surface positioned above the tile grid cell so as to provide a reference point on the surface;

wherein the reference point is used to determine an installation position for a fire sprinkler head.

11. The method of claim 10 further comprising measuring a distance along the second axis from an edge of the grid cell to the center of the second axis.

12. The method of claim 10 further comprising measuring a distance from the reference point to a water source.

13. The method of claim 12 further comprising attaching a pipe to the water source and the fire sprinkler head wherein the pipe has a length corresponding to the distance measured from the water source to the reference point.

14. The method of claim 13 further comprising attaching a fire sprinkler head to the pipe wherein the fire sprinkler head is positioned proximate to the center of the tile grid cell.

15. The method of claim 10 wherein the body of the measurement device comprises an elongate frame and wherein the light source is positioned proximate to the center of the frame.

16. The method of claim 15 wherein the body of the measurement device has a length of approximately two feet.

17. The method of claim 16 wherein the light source is a laser diode.

18. The method of claim 16 wherein the measurement device further comprises an arm attached to and positioned substantially perpendicular to the frame, the arm adapted to position the measurement device around the center of the tile grid cell.

19. The method of claim 18 wherein the arm has a length of around one foot.

20. The method of claim 18 wherein the arm has a length of around two feet.

21. The method of claim 18 wherein the arm of the measurement device comprises a first arm and the measurement device further comprises a second arm attached and positioned substantially perpendicular relative to the frame wherein the second arm extends in a direction opposite the first arm.

* * * * *